(12) United States Patent
Komatsu et al.

(10) Patent No.: US 9,840,008 B2
(45) Date of Patent: Dec. 12, 2017

(54) ROBOT SYSTEM CONTROL METHOD AND ROBOT SYSTEM

(71) Applicant: Panasonic Intellectual Property Management Co., Ltd., Osaka (JP)

(72) Inventors: Takamichi Komatsu, Osaka (JP); Tatsuya Ikeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 14/775,694

(22) PCT Filed: Mar. 17, 2014

(86) PCT No.: PCT/JP2014/001499
§ 371 (c)(1),
(2) Date: Sep. 12, 2015

(87) PCT Pub. No.: WO2014/148032
PCT Pub. Date: Sep. 25, 2014

(65) Prior Publication Data
US 2016/0023355 A1    Jan. 28, 2016

(30) Foreign Application Priority Data
Mar. 19, 2013    (JP) .................................. 2013-056339

(51) Int. Cl.
*B25J 9/16* (2006.01)
*B25J 3/00* (2006.01)
*B25J 9/00* (2006.01)

(52) U.S. Cl.
CPC .............. *B25J 9/1682* (2013.01); *B25J 3/00* (2013.01); *B25J 9/0084* (2013.01); *B25J 9/1607* (2013.01);
(Continued)

(58) Field of Classification Search
CPC . B25J 9/1682; B25J 3/00; B25J 9/0084; B25J 9/1607; G05B 2219/39132;
(Continued)

(56) References Cited

U.S. PATENT DOCUMENTS 5,440,099 A * 8/1995 Smith .................... B23K 9/287
219/125.1
6,069,338 A * 5/2000 Sano .................... B23K 11/314
219/86.22
(Continued)

FOREIGN PATENT DOCUMENTS

CN       102662350       9/2012
EP       1090722 B1 *    7/2007 ............ B25J 9/1682
(Continued)

OTHER PUBLICATIONS

International Search Report of PCT application No. PCT/JP2014/001499 dated Apr. 8, 2014.
(Continued)

*Primary Examiner* — Rami Khatib
*Assistant Examiner* — Jeffrey C Boomer
(74) *Attorney, Agent, or Firm* — Wenderoth, Lind & Ponack, L.L.P.

(57) ABSTRACT

A robot system control method includes a first step through a fifth step. Particularly in the second step, a second transformation matrix that represents the positional relation between a first slave robot and a second slave robot is generated and stored in a master robot. In the fourth step, based on a second command obtained using a first transformation matrix and the second transformation matrix, the master robot instructs the second slave robot to operate. In the fifth step, the first slave robot and the second slave robot perform a cooperative operation with the master robot. Thus, in the state where a working robot that can perform TCP
(Continued)

matching with only part of the other robots is set to a master robot, all of the robots can perform a cooperative operation.

13 Claims, 9 Drawing Sheets

(52) U.S. Cl.
CPC .............. *G05B 2219/39121* (2013.01); *G05B 2219/39132* (2013.01); *G05B 2219/39139* (2013.01); *Y10S 901/08* (2013.01)

(58) Field of Classification Search
CPC  G05B 2219/39121; G05B 2219/39139; Y10S 901/08
See application file for complete search history.

(56) References Cited

U.S. PATENT DOCUMENTS

| | | |
|---|---|---|
| 6,330,493 B1 | 12/2001 | Takahashi et al. |
| 7,558,646 B2 | 7/2009 | Matsumoto et al. |
| 7,860,609 B2 | 12/2010 | Yanagita et al. |
| 2002/0029095 A1* | 3/2002 | Kosaka ................. B25J 9/1674 700/245 |
| 2005/0055132 A1 | 3/2005 | Matsumoto et al. |
| 2005/0189399 A1* | 9/2005 | Kilibarda ............... B62D 65/02 228/47.1 |
| 2005/0263496 A1* | 12/2005 | Kobayashi ............. B23K 11/11 219/86.25 |
| 2006/0287769 A1* | 12/2006 | Yanagita ................ B25J 9/1669 700/245 |
| 2011/0301733 A1* | 12/2011 | Yoshima ............. B23K 9/0216 700/96 |
| 2015/0148952 A1* | 5/2015 | Shiratsuchi ........... B25J 9/1682 700/248 |

FOREIGN PATENT DOCUMENTS

| | | |
|---|---|---|
| JP | 6-278063 | 10/1994 |
| JP | 8-057780 | 3/1996 |
| JP | 9-207088 | 8/1997 |
| JP | 2001-150372 | 6/2001 |
| JP | 2003-145462 | 5/2003 |
| JP | 2005-173849 | 6/2005 |
| JP | 2005-246543 | 9/2005 |
| JP | 2005-262369 | 9/2005 |
| JP | 2009-148890 | 7/2009 |
| WO | 2004/048049 | 6/2004 |

OTHER PUBLICATIONS

Chinese Search Report dated May 19, 2016 in related Chinese Patent Application No. 2014800168227.

* cited by examiner

FIG. 4

| Target position command | Operation velocity | Operation command | Target position of master robot | | | | Target position of first slave robot | | | | Target position of second slave robot | | | |
|---|---|---|---|---|---|---|---|---|---|---|---|---|---|---|
| | xx | yy | J1a | J2a | ... | Jla | J1b | J2b | ... | Jma | J1c | J2c | ... | Jnc |

ROBOT SYSTEM CONTROL METHOD AND ROBOT SYSTEM

This application is a U.S. national stage application of the PCT international application No. PCT/JP2014/001499.

TECHNICAL FIELD

The present disclosure relates to a method for controlling a robot system and to a robot system, using industrial robots, particularly to a robot system in which a plurality of robots operates in cooperation with each other.

BACKGROUND ART

Recently, a robot system has been required to perform an operation on a wide variety of complicated work pieces. Particularly, a robot system needs to be used in diversified small-quantity production. Further, in a robot system, the number of facilities including robots, and the installation area need to be suppressed. For this purpose, the following robot system is introduced. In this robot system, a jig peculiar to each work piece is not used, and a robot for holding a working tool and a robot for holding a work piece are operated in cooperation with each other (hereinafter referred to as a cooperative operation).

FIG. 9 is a diagram showing an example of a conventional robot system using two robots. In FIG. 9, robot D is a master robot that holds working tool 31, and robot E is a slave robot that holds handling device 34. Robot D performs a cooperative operation with robot E on work piece W held by handling device 34 of robot E. Hereinafter, the robot that holds a working tool is referred to as a "working robot", and the robot that holds a handling device is referred to as a "handling robot". The robot that gives operation instructions to a slave robot is referred to as a "master robot" and the robot that operates in accordance with the instructions of the master robot is referred to as a "slave robot".

Cooperative operation of robot D, i.e. a working robot, and robot E, i.e. a handling robot, requires transformation matrix $T_{DE}$ that represents the positional relation between robot coordinate system Σd of robot D and robot coordinate system Σe of robot E. Each of robot D and robot E has a tool center point (hereinafter, a TCP), which is a control point. Conventionally, transformation matrix $T_{DE}$ is calculated by matching the TCP of robot D with the TCP of robot E at three points that are not on one straight line. This operation is referred to as "TCP matching". The work piece held by robot E is represented by robot coordinate system Σe of robot E. Thus, in cooperative operation, transformation matrix $T_{DE}$ allows robot D to operate with a locus and a velocity represented by work coordinate system Σw in which the TCP of robot E is the origin of the coordinate.

In order to add working robot F to this robot system and to increase operating efficiency, it is required to generate transformation matrix $T_{DF}$ between added working robot F and existing robot D and transformation matrix $T_{EF}$ between added working robot F and existing robot E, and to store the related transformation matrices in the controllers of the respective robots.

The following method is known as one of the methods for addressing this problem. One master robot performs TCP matching with each of a plurality of slave robots, generates transformation matrices equal in number to the slave robots, and stores the transformation matrices in the controller of the master robot. At this time, TCP matching between the slave robots is unnecessary. In automatic operation, the master robot transmits position data on the teaching point and the interpolation point of the master robot to the plurality of slave robots. Based on the position data on the teaching point and the interpolation point that has been transmitted from the master robot, each of the slave robots corrects the teaching point or the interpolation point in the program of the slave robot. Thus, three or more robots can perform a cooperative operation (see Patent Literature 1, for example).

CITATION LIST

Patent Literature

PTL1 Japanese Patent Unexamined Publication No. 2001-150372

SUMMARY OF THE INVENTION

When the method described in Patent Literature 1 is used, the TCP of the master robot needs to be matched with the TCPs of a plurality of slave robots. However, depending on the positions of the plurality of robots that form a robot system, the TCP matching between the working robots may be difficult. In this case, a handling robot that can perform TCP matching with all the working robots needs to be set to a master robot. However, the master robot is most frequently used by the operator when the robot system is in operation. The working robot is most frequently used by the operator in the preparation step of the robot system, including teaching operation. When a handling robot is set to a master robot, the operator needs to change the robot to be operated in the preparation step and in operation of the robot system. This reduces operating efficiency.

In consideration with the above problem, the present disclosure provides a robot system control method and a robot system that have high operating efficiency even when three or more robots are used.

In order to address the above problem, a robot system control method of the present disclosure includes a first step through a fifth step. In the first step, a first transformation matrix that represents the positional relation between a master robot and a first slave robot is generated and stored in the master robot. In the second step, a second transformation matrix that represents the positional relation between the first slave robot and a second slave robot is generated and stored in the master robot. In the third step, based on a first command obtained using the first transformation matrix, the master robot instructs the first slave robot to operate. In the fourth step, based on a second command obtained using the first transformation matrix and the second transformation matrix, the master robot instructs the second slave robot to operate. In the fifth step, the first slave robot and the second slave robot perform a cooperative operation with the master robot.

A robot system of the present disclosure includes a master robot, a first slave robot, and a second slave robot. The master robot includes a first storage, a second storage, and a first arithmetic part. The first slave robot and the second slave robot are connected to the master robot. The first storage stores a first transformation matrix that represents the positional relation between the master robot and the first slave robot. The second storage stores a second transformation matrix that represents the positional relation between the first slave robot and the second slave robot. Using the first transformation matrix, the first arithmetic part obtains a first command, and instructs the first slave robot to operate.

Using the first transformation matrix and the second transformation matrix, the first arithmetic part obtains a second command, and instructs the second slave robot to operate. The first slave robot and the second slave robot perform a cooperative operation with the master robot.

As described above, in accordance with the present disclosure, in the state where a working robot that can perform TCP matching with only part of the other robots is set to a master robot, all of the robots can perform a cooperative operation. This can increase the operating efficiency of the operator.

BRIEF DESCRIPTION OF DRAWINGS

FIG. 4 is a chart showing a configuration of target position commands in accordance with the first exemplary embodiment.

DESCRIPTION OF EMBODIMENT

Figure 1:
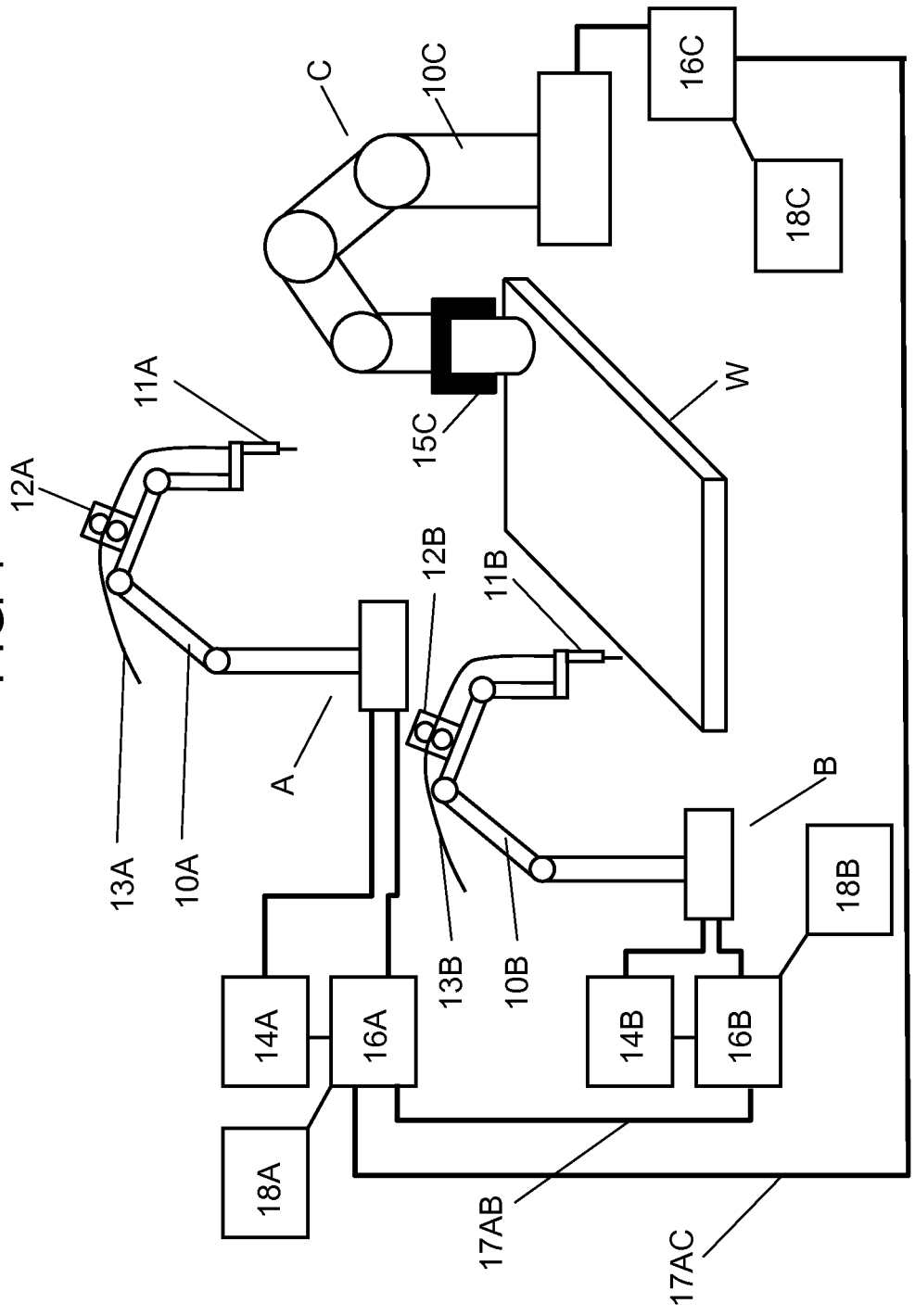
FIG. 1 is a diagram showing a schematic configuration of a robot system in accordance with a first exemplary embodiment of the present disclosure.

Hereinafter, a description is provided for an exemplary embodiment of the present invention with reference to FIG. 1 through FIG. 8.
First Exemplary Embodiment FIG. 1 is a diagram showing a robot system in which three robots cooperatively perform a welding operation in accordance with this exemplary embodiment. In this robot system, robot A (a master robot) and robot B (a second slave robot) are working robots for welding operation, and robot C (a first slave robot) is a handling robot for holding a work piece.

Robot A includes manipulator 10A, welding torch 11A, welding wire feeder 12A, welding wire 13A, welding machine 14A, and controller 16A.

Welding machine 14A is electrically connected to welding torch 11A and controls welding current and welding voltage. Welding machine 14A is electrically connected to welding wire feeder 12A, and controls the feeding speed of welding wire 13A.

Robot B includes manipulator 10B, welding torch 11B, welding wire feeder 12B, welding wire 13B, welding machine 14B, and controller 16B. Welding machine 14B is electrically connected to welding torch 11B and controls welding current and welding voltage. Welding machine 14B is electrically connected to welding wire feeder 12B, and controls the feeding speed of welding wire 13B.

Robot C includes manipulator 10C, handling device 15C, and controller 16C, and can hold work piece W with handling device 15C.

Robot A is controlled by controller 16A and robot B is controlled by controller 16B. More specifically, controllers 16A and 16B give instructions on welding conditions, e.g. welding voltage, welding current, and wire feeding speed, to welding machines 14A and 14B, and give movement instructions to manipulators 10A and 10B, respectively. Robots A and B perform welding operation on work piece W by executing these instructions. Robot C is controlled by controller 16C. More specifically, controller 16C gives instructions for opening and closing the hand of handing device 15C to handling device 15C, and movement instructions to manipulator 10C. By executing these instructions, robot C opens and closes the hand of handling device 15C, and holds, releases, and transfers work piece W.

In the robot system of this exemplary embodiment, robot A is set to a master robot and performs operation with robot B and robot C, which are set to slave robots. The master robot makes communication for cooperative operation, with the slave robots. For this purpose, controller 16A is connected to controller 16B by optical fiber cable 17AB. Controller 16A is connected to controller 16C by optical fiber cable 17AC.

In the robot system of this exemplary embodiment, an optical fiber cable, which is resistant to electrical noise, is used as a communication line that connects the controllers. However, examples of the communication line include other cables for use in Local Area Network (LAN) or serial communication. Wireless communication without using a communication line may be used.

Controllers 16A, 16B, and 16C are connected to teaching pendants 18A, 18B, and 18C as input devices, respectively. Using the teaching pendants, the operator operates robots or makes settings, such as switching between a master mode and a slave mode, in the respective controllers. Each of teaching pendants 18A, 18B, and 18C includes the following elements: a robot arithmetic part (not shown); a mode switching part (not shown) for allowing the operator to switch the slave robot state and the master robot state; a data display part (not shown) for displaying various types of data, e.g. welding current and wire feeding speed; and a data setting part (not shown) for allowing the operator to set various types of data.

Figure 2:
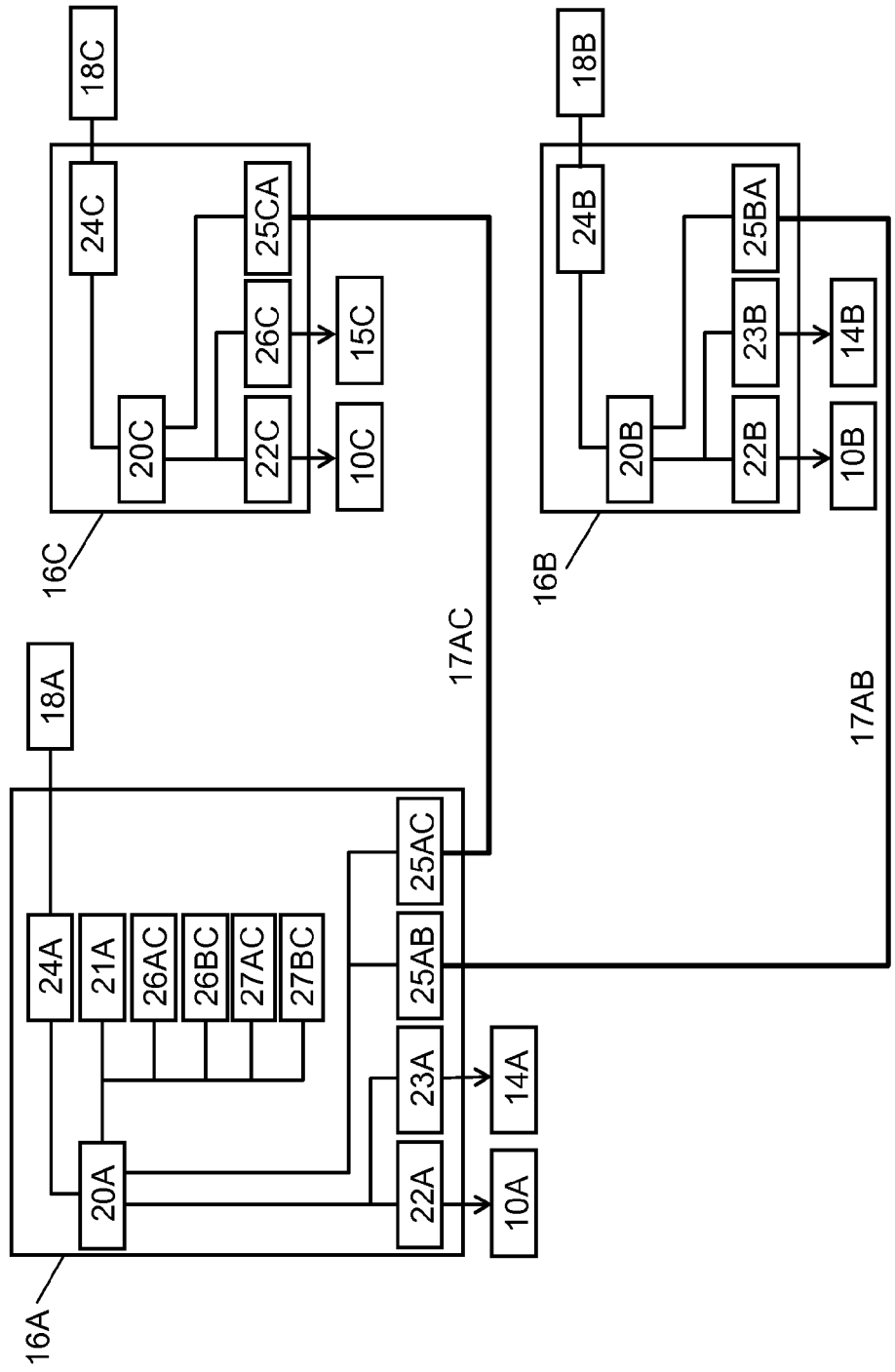
FIG. 2 is a diagram showing an outline of connection between controllers in accordance with the first exemplary embodiment.

FIG. 2 shows configurations of controllers 16A, 16B, and 16C.

Controller 16A of robot A as a master robot includes arithmetic part 20A, teaching data storage 21A, manipulator controller 22A, welding condition command part 23A, communication part 24A, slave robot communication parts 25AB and 25AC, calibration point storages 26AC and 26BC, and transformation matrix storages 27AC (a first storage) and 27BC (a second storage).

Arithmetic part 20A includes CPU for performing various internal operations, and a memory. Teaching data storage 21A stores taught data for playback operation in automatic operation. Based on the result of the computation performed in arithmetic part 20A, manipulator controller 22A controls manipulator 10A. Welding condition command part 23A gives a command on welding conditions, such as welding current, to welding machine 14A. Communication part 24A communicates with teaching pendant 18A. Slave robot communication part 25AB transmits an operation command and a welding command to robot B as a slave robot, and receives information from robot B. Slave robot communication part 25AC transmits an operation command and a handling command to robot C as a slave robot, and receives information from robot C. The instruction from robot A to robot B is referred to as a second command. The instruction from robot A to robot C is referred to as a first command. Calibration point storage 26AC stores the TCP positions and the TCP direction vectors of robot A and robot C, which are necessary for cooperative operation of the respective robots. Transformation matrix storage 27AC stores transformation matrix $T_{CA}$ (a first transformation matrix) between robot A and robot C that is calculated from the data in calibration point storage 26AC. Calibration point storage 26BC stores the TCP positions and the TCP direction vectors of robot B and robot C, which are necessary for cooperative operation of the respective robots. Transformation matrix storage 27BC stores transformation matrix $T_{CB}$ (a second transformation matrix) between robot B and robot C that is calculated from the data in calibration point storage 26BC.

Controller 16B of robot B as a slave robot includes arithmetic part 20B, manipulator controller 22B, welding condition command part 23B, communication part 24B, and master robot communication part 25BA. Arithmetic part 20B, manipulator controller 22B, welding condition command part 23B, and communication part 24B function similarly to those in controller 16A. Master robot communication part 25BA receives an operation command and a welding command from robot A, i.e. a master robot in this exemplary embodiment, and transmits information on robot B. However, the contents of the data transmitted and received by master robot communication part 25BA may be different depending on the role of robot B. Controller 16B may have a configuration similar to that of controller 16A such that robot B can function as a master robot.

Controller 16C of robot C as a slave robot includes arithmetic part 20C, manipulator controller 22C, handling command part 26C, communication part 24C, and master robot communication part 25CA. Arithmetic part 20C, manipulator controller 22C, and communication part 24C function similarly to those in controller 16A. Master robot communication part 25CA receives an operation command and a handling command from robot A, i.e. a master robot in this exemplary embodiment, and transmits information on robot C. However, the contents of the data transmitted and received by master robot communication part 25CA may be different depending on the role of robot C. Controller 16C may have a configuration similar to that of controller 16A such that robot C can function as a master robot.

In this exemplary embodiment, controller 16A of robot A as a master robot stores, in teaching data storage 21A, teaching points of robot A, robot B, and robot C as one set. The data stored in teaching data storage 21A is read out by arithmetic part 20A in playback operation. Arithmetic part 20A calculates the amount of operation of each robot, and the operation and welding of robot A are controlled via manipulator controller 22A and welding condition command part 23A.

The operation and welding of robot B as a slave robot are controlled by commands transmitted from controller 16A to controller 16B, via slave robot communication part 25AB. Specifically, in controller 16B, arithmetic part 20B processes the commands received from controller 16A by master robot communication part 25BA. The operation and welding of robot B are controlled via manipulator controller 22B and welding condition command part 23B. Controller 16B transmits the information, e.g. the current posture and welding output state of robot B, to controller 16A, via master robot communication part 25BA.

Similarly, the operation and handling of robot C as a slave robot are controlled by commands transmitted from controller 16A to controller 16C, via slave robot communication part 25AC. Specifically, arithmetic part 20C processes the commands received from controller 16A by master robot communication part 25CA. The operation and handling of robot C are controlled via manipulator controller 22C and handling command part 26C. Controller 16C transmits the information, e.g. the current posture of robot C and the output state of handling device 15C, to controller 16A, via master robot communication part 25CA.

The above configuration allows simultaneous control of two robots having welding machines and one robot having a handling device.

Next, a description is provided for a method for generating transformation matrices necessary for cooperative operation of robots A through robot C. A transformation matrix represents the relation between two different coordinate systems. Using the transformation matrix, a position vector represented by one coordinate system can be transformed into a position vector represented by the other coordinate system. In this exemplary embodiment, robot A and robot B as working robots need to perform a cooperative operation with robot C as a handling robot. Thus, generating transformation matrices requires the positional relation between robot A and robot C and the positional relation between robot B and robot C.

Figure 3:
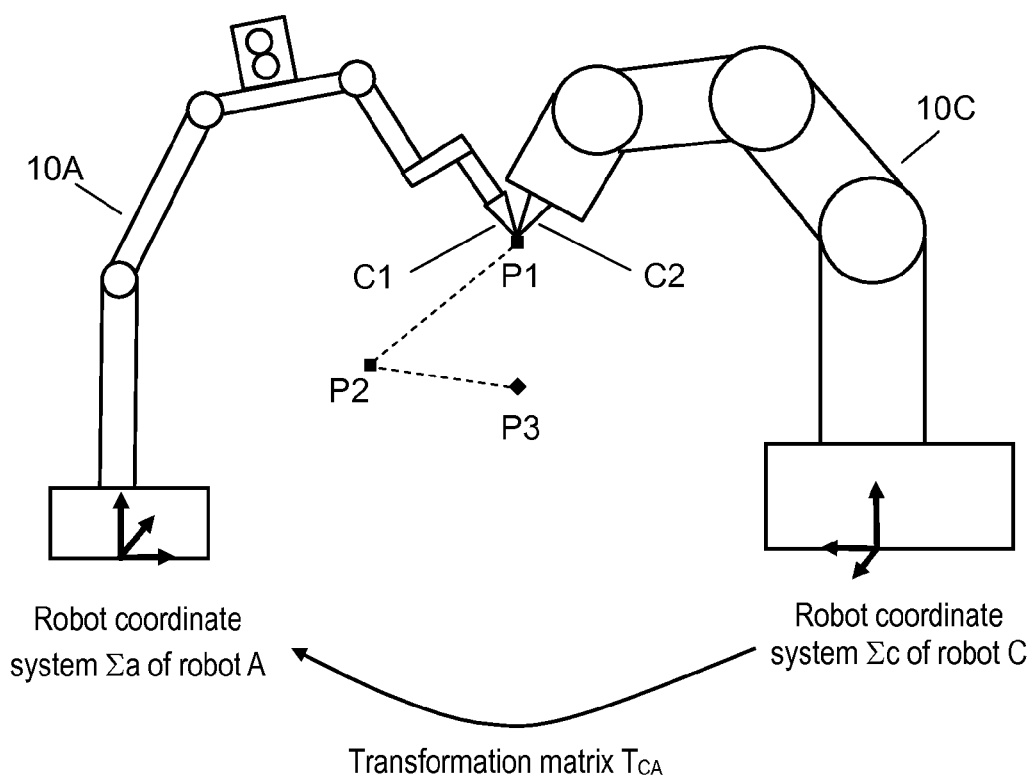
FIG. 3 is diagram for explaining TCP matching for generating a transformation matrix in accordance with the first exemplary embodiment.

First, a description is provided for a method for generating transformation matrix $T_{CA}$ between robot A and robot C, with reference to FIG. 3. As shown in FIG. 3, teaching chip C1 is attached to welding torch 11A mounted on the tip of manipulator 10A of robot A. Then, the offset from the tip of the wrist of robot A (the tip of manipulator 10A) to the tip of teaching chip C1 is set properly. This operation sets the tip of teaching chip C1 to the TCP of robot A. The TCP is a control point of the robot.

In robot C, part of handling device 15C mounted on the tip of manipulator 10C is set to a reference point, and the value of the offset from the tip of the wrist of robot C (the tip of manipulator 10C) to the reference point is set properly. For instance, the center of both hand tips of handling device 15C is set to a reference value. When a proper reference point cannot be set in handling device 15C, the method shown in FIG. 3 may be used. That is, handling device 15C is removed and jig C2 that ensures the setting of the reference point is attached to the tip of manipulator 10C of robot C. The reference point set by either method is the TCP of robot C.

Next, the operator operates teaching pendant 18C so as to switch controller 16C to a slave robot mode. Then, using teaching pendant 18A of robot A as a master robot, the operator operates both of robot A as a master robot and robot C as a slave robot. Thereafter, as shown in FIG. 3, the operator matches the TCP of robot A with the TCP of robot C at three points (P1, P2, and P3) that are not on one straight line in space, in the state where the direction vectors of both TCPs are not changed.

At this time, calibration point storage 26AC stores the TCP positions and the TCP direction vectors of robots A and C on these three points, in robot coordinate systems Σa and Σc in which the reference points of robots A and C are the origins, respectively. From the obtained data on the three TCP positions and three direction vectors of robot A and the obtained data on the three TCP positions and three direction vectors of robot C, transformation matrix $T_{CA}$ from robot coordinate system Σc of robot C to robot coordinate system Σa of robot A can be obtained through calculation in arithmetic part 20A. Transformation matrix $T_{CA}$ is stored in transformation matrix storage 27AC.

Next, a description is provided for a method for generating transformation matrix $T_{CB}$ between robot B and robot C.

Basically, the method is similar to the above method for obtaining transformation matrix $T_{CA}$ between robot A and robot C. First, teaching chip C1 is attached to welding torch 11B mounted on the tip of manipulator 10B of robot B. Then, the offset from the tip of the wrist of robot B (the tip of manipulator 10B) to the tip of teaching chip C1 is set properly. This operation sets the tip of teaching chip C1 to the TCP of robot B.

Next, the operator operates teaching pendant 18B and teaching pendant 18C so as to switch controller 16B and controller 16C to the slave robot mode. Then, using teaching pendant 18A of robot A as a master robot, the operator operates both of robot B and robot C as slave robots. Thereafter, in a similar manner when the transformation matrix between robot A and robot C is obtained, the operator matches the TCP of robot B with the TCP of robot C on three points that are not on one straight line in space, in the state where the direction vectors of both TCPs are not changed.

At this time, calibration point storage 26BC stores the TCP positions and the TCP direction vectors of robots B and C on the three points, in robot coordinate systems $\Sigma b$ and $\Sigma c$ in which the reference points of robots B and C are the origins, respectively. From the obtained data on the three TCP positions and three direction vectors of robot B and the obtained data on the three TCP positions and three direction vectors of robot C, transformation matrix $T_{CB}$ for transforming robot coordinate system $\Sigma c$ of robot C to robot coordinate system $\Sigma b$ of robot B can be obtained through calculation in arithmetic part 20A. Transformation matrix $T_{CB}$ is stored in transformation matrix storage 27BC.

Using transformation matrix $T_{CA}$ and transformation matrix $T_{CB}$, the TCPs of robot A and robot B can be represented by work coordinate system $\Sigma w$ in which the tip of manipulator 10C of robot C is the origin of the coordinate system. Thus, the TCPs of robot A and robot B can perform a cooperative operation with robot C with the velocity and locus represented by work coordinate system $\Sigma w$. This is suitable for welding a complicated work piece.

Next, a detailed description is provided for a method for cooperatively operating three robots in the above configuration, with reference to the accompanying drawings.

Arithmetic part 20A invokes, from teaching data storage 21A, an operation program for cooperatively operating robots A through C. Then, following the operation procedure in the operation program, arithmetic part 20A gives instructions to robots A through C and processes information obtained from robots A through C. The operation program is composed of various commands including a target position command, which is a characteristic command in cooperative operation. As shown in FIG. 4, the target position commands include instructions on the operation of the manipulators. Such instructions include the following items: the target angle and operation velocity (rotational velocity) of each axis constituting manipulators 10A through 10C of robots A through C; whether the TCPs are caused to perform linear movement or curve movement between two points; and whether a plurality of robots is caused to perform a cooperative operation or not.

Figure 5:
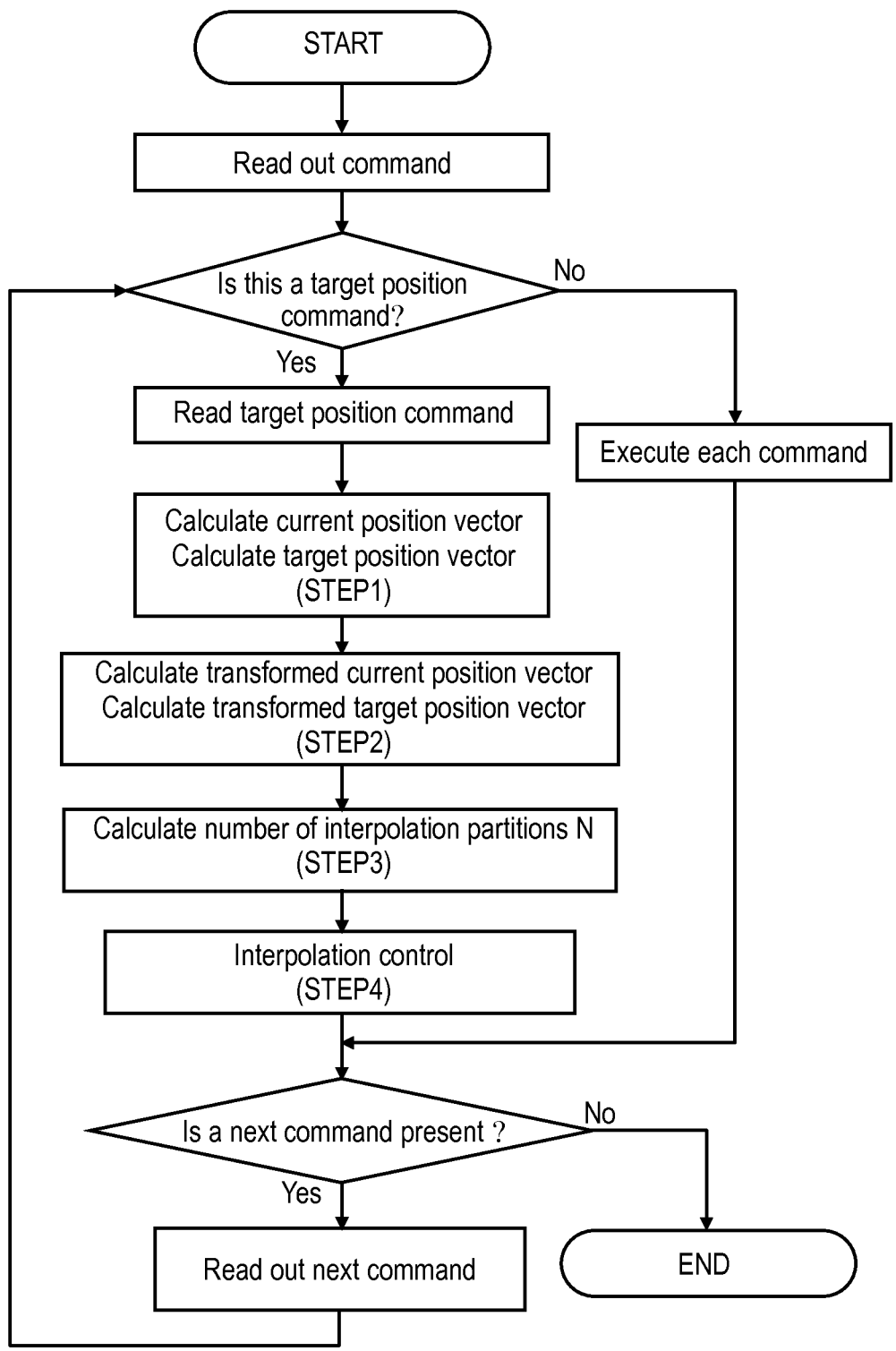
FIG. 5 is a flowchart of program execution processing in accordance with the first exemplary embodiment.

FIG. 5 shows a flowchart when arithmetic part 20A processes the operation program. Arithmetic part 20A reads out the operation program from teaching data storage 21A and determines whether the command in the operation program is a target position command or not. In FIG. 5, the processing is shown in a case where the target position command for cooperative operation is read out.

When the command read out is a target position command, arithmetic part 20A calculates "current position vector Sni (i=a, b, c)" and "target position vector Sri (i=a, b, c)". Here, the current position vector represents the current TCP position and the current TCP direction vector of each of robots A through C. The target position vector represents the TCP position and the TCP direction vector targeted by each of robots A through C that are calculated from the angle of each axis of each manipulator included in the target position command. This step of calculating the current position vector and the target position vector is STEP 1.

Figure 6:
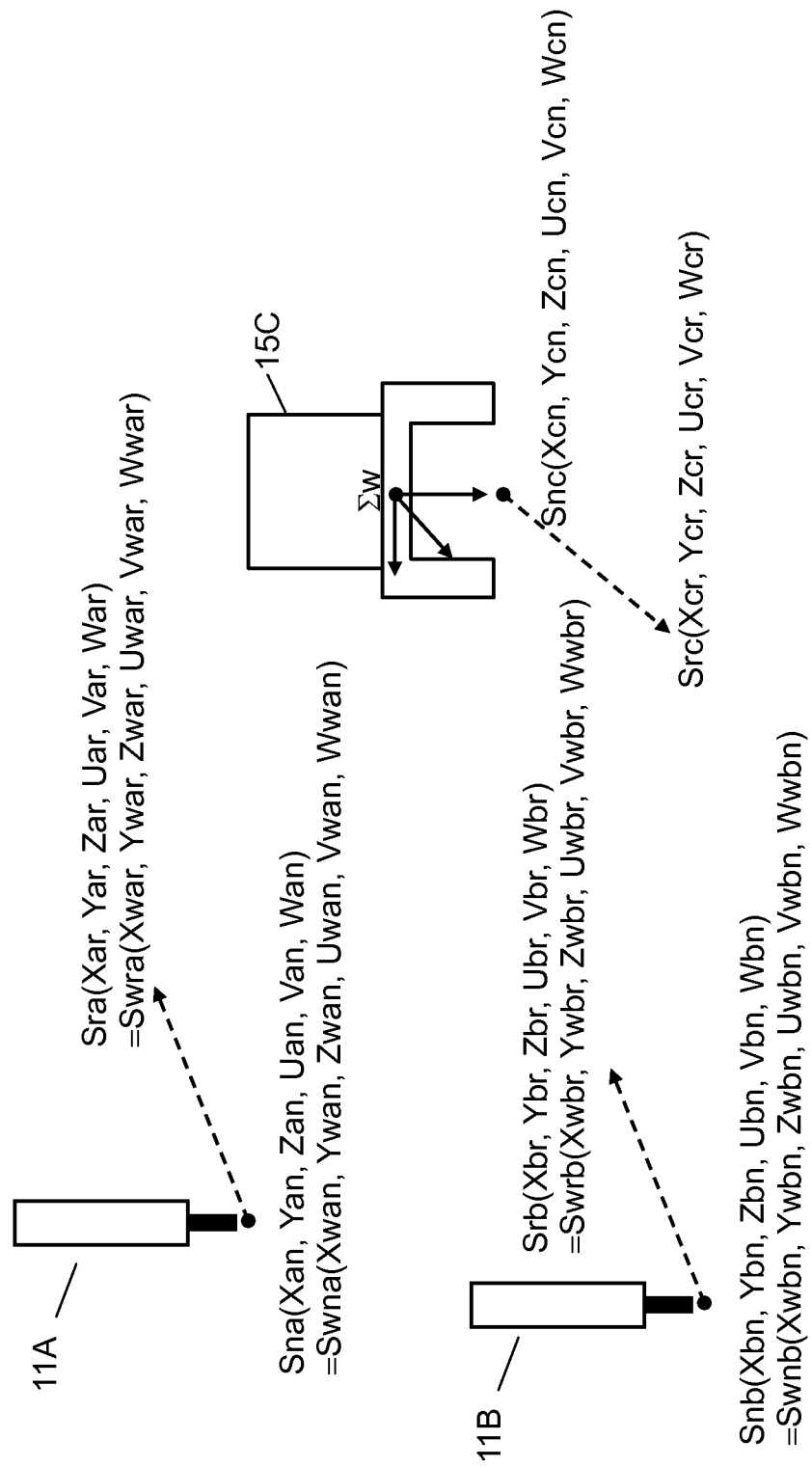
FIG. 6 is a chart for explaining coordinate systems of each robot in accordance with the first exemplary embodiment.

Current position vector Sna of the TCP of robot A is represented by six parameters because the robot coordinate system of robot A is three-dimensional and the current position vector represents the position and angle of the TCP of robot A in each dimension. For instance, as shown in FIG. 6, current position vector Sna is represented as (Xan, Yan, Zan, Uan, Van, Wan) in robot coordinate system $\Sigma a$ of robot A. Similarly, also with robot B and robot C, each of current position vector Snb and current position vector Snc is represented by six parameters in robot coordinate system $\Sigma b$ or $\Sigma c$ of the corresponding robot. Each of target position vector Sra of robot A, target position vector Srb of robot B, and target position vector Src of robot C is represented by six parameters in robot coordinate systems $\Sigma a$, $\Sigma b$ or $\Sigma c$ of the corresponding robot.

Next, current position vector Sna and target position vector Sra of robot A are transformed, using transformation matrix $T_{CA}$ that has already been obtained and stored in transformation matrix storage 27AC. Using transformation matrix $T_{CA}$, robot coordinate system $\Sigma a$ of robot A can be transformed into work coordinate system $\Sigma w$. Thus, current position vector Sna and target position vector Sra of robot A are transformed into transformed current position vector Swna and transformed target position vector Swra, respectively, in work coordinate system $\Sigma w$. Similarly, current position vector Snb and target position vector Srb of robot B are transformed, using transformation matrix $T_{CB}$ stored in transformation matrix storage 27BC. Using transformation matrix $T_{CB}$, robot coordinate system $\Sigma b$ of robot B can be transformed into work coordinate system $\Sigma w$. Thus, current position vector Snb and target position vector Srb of robot B are transformed into transformed current position vector Swnb and transformed target position vector Swrb, respectively, in work coordinate system $\Sigma w$. With respect to the TCP of robot C, robot coordinate system $\Sigma c$ of robot C has already been correlated with work coordinate system $\Sigma w$, and thus transformation is unnecessary. The step of calculating these transformed current position vectors and transformed target position vectors is STEP 2.

Next, number of interpolation partitions N is calculated so that the TCP of robot A operates at a specified velocity from transformed current position vector Swna to transformed target position vector Swra. The step of calculating number of interpolation partitions N is STEP 3.

Normally, a robot controls the angle of each axis for each fixed interpolation time period Ts (hereinafter, interpolation control). By repeating this interpolation control, the specified movement is completed. With the interpolation control, the robot is controlled so as to follow the locus of the movement. Thus, in order to operate the robot at a specified velocity, it is necessary to calculate the number of times of repetition of interpolation control that allows the completion of the movement of the TCPs from current position vectors Sna, Snb, and Snc to target position vectors Sra, Srb, and Src. In this exemplary embodiment, the number of times of interpolation control is calculated in reference to the linear movement of the TCP of robot A as a master robot from current position vector Sna to target position vector Sra.

Number of interpolation partitions N can be obtained with the following calculating formula:

$$N=(Swra-Swna)\div \text{Operation velocity}\div Ts$$

The robot used for reference may be robot B as a slave robot, instead of robot A as a master robot. In that case, it is only necessary to replace Swna and Swra with Swnb and Swrb, respectively. Robot C as a slave robot can also be used similarly to robot B.

After number of interpolation partitions N has been obtained, interpolation control is repeated. The repetitive processing of interpolation control is STEP 4. That is, repeating interpolation control N times can move the TCP of each of robot A through robot C from the current position vector to the target position vector. Thus, the target position command is completed.

As described above, after controller 16A has completed one target position command, the controller determines whether the next command is present or not. When the next command is present, the next command is read out and executed. When the next command is a target position command, the controller performs STEPs 1 through 4 again. When the next command is not present, the operation program is completed.

Here, the interpolation control in STEP4 is detailed with reference to FIG. 7.

Figure 7:
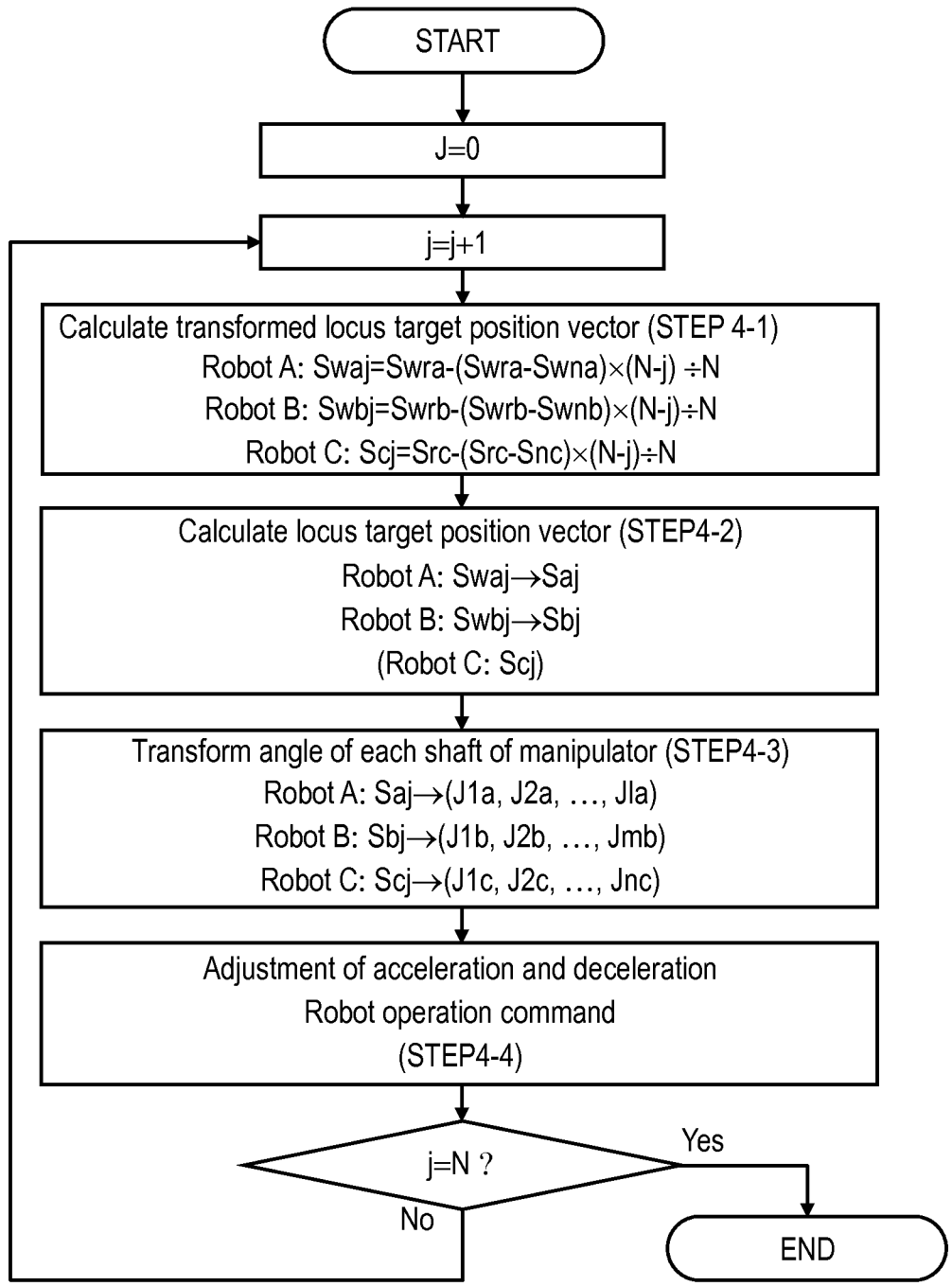
FIG. 7 is a flowchart of interpolation control processing in accordance with the first exemplary embodiment.

In order to repeat the interpolation control, as shown in FIG. 7, transformed target position vector in work coordinate system Σw, which is the basis of the locus control, is calculated at each time of interpolation control. For robot A and robot B, in order to calculate the loci in work coordinate system Σw, transformed current position vectors Swna and Swnb and transformed target position vectors Swra and Swrb in work coordinate system Σw are used. In robot A, transformed locus target position vector Swaj when the repetitive interpolation control is performed for the j-th time can be calculated with the following equation:

$$Swaj=Swra-(Swra-Swna)\times(N-j)\div N \quad \text{(Equation 1)}$$

Similarly, in robot B, transformed locus target position vector when the interpolation control is performed for the j-th time can be calculated with the following equation:

$$Swbj=Swrb-(Swrb-Swnb)\times(N-j)\div N \quad \text{(Equation 2)}$$

(Equation 1) and (Equation 2) show that transformed current position vectors Swna and Swrb of robots A and B at the start of interpolation control move toward transformed target position vectors Swra and Swnb, respectively, every time interpolation control is performed. (Equation 1) and (Equation 2) mean that the TCP of robot A and the TCP of robot B reach transformed target position vectors Swra and Swrb, respectively, when the last, i.e. the N-th, interpolation control operation is completed.

In contrast, robot C does not perform operation that is based on work coordinate system Σw, and thus locus target position vector Scj of robot C in robot coordinate system Σc is calculated with the following equation:

$$Scj=Src-(Src-Snc)\times(N-j)\div N \quad \text{(Equation 3)}$$

This means that the TCP of robot C reaches target position vector Src of robot C when N interpolation control operations have been completed in robot coordinate system Σc of robot C. This step of calculating the transformed locus target position vectors is STEP 4-1.

Transformed locus target position vectors Swaj and Swbj of robots A and B in work coordinate system Σw are calculated. Next, the vectors are transformed to locus target position vectors Saj and Sbj in robot coordinate system Σa and Σb, respectively. Both transformed locus target position vector Swaj of robot A and transformed locus target position vector Swbj of robot B calculated in STEP 4-1 are values in work coordinate system Σw. Work coordinate system Σw is correlated with robot coordinate system Σc of robot C. Thus, transformed locus target position vectors Swaj and Swbj can be transformed into locus target position vectors Saj and Sbj in robot coordinate systems Σa and Σb, using transformation matrix $T_{CA}$ and transformation matrix $T_{CB}$, respectively. This step of calculating locus target position vectors is STEP 4-2.

After locus target position vectors Saj, Sbj, and Scj in robot coordinate systems Σa, Σb, and Σc, have been calculated, next, locus target position vectors Saj, Sbj, and Scj are transformed into the angle of each axis of manipulators 10A, 10B, and 10C, respectively. This transformation is made by computation of general inverse kinematics. This transformation step is STEP 4-3.

After the transformation into the angle of each axis has been completed, adjustments, e.g. acceleration and deceleration of motor driving, are made and operation commands are given from controller 16A to robots A through C. This step of giving operation commands is STEP4-4.

In the case of robot A, a command of the target angle of each axis of manipulator 10A calculated in arithmetic part 20A of controller 16A is given to manipulator controller 22A. Manipulator controller 22A controls a motor of manipulator 10A so that the manipulator reaches the target angle in interpolation time period Ts.

In the case of robot B, the target angle of each axis of manipulator 10B calculated in arithmetic part 20A of controller 16A is transmitted to arithmetic part 20B of controller 16B via slave robot communication part 25AB. Arithmetic part 20B gives a command on the received angle of the axis of manipulator 10B to manipulator controller 22B. Manipulator controller 22B controls a motor of manipulator 10B so that the manipulator reaches the target angle in interpolation time period Ts.

Similarly to robot B, robot C also controls a motor of manipulator 10C, based on the command from controller 16A of robot A as a master robot.

Repeating this interpolation control N times allows robots A through C to reach transformed target position vectors Swra, Swrb, and Src from transformed current position vectors Swna, Swnab, and Snc, via transformed locus target position vectors Swaj, Swbj, and Scj. This means that robots A and B reach target position vectors Sra and Srb from current position vectors Sna and Snb via locus target position vectors Saj and Sbj.

The above description has been presented for the interpolation control. Next, the action in this exemplary embodiment is described.

In this exemplary embodiment, two slave robots (robots B and C) are connected to one master robot (robot A). Controller 16A of robot A as a master robot stores not only transformation matrix $T_{CA}$ between a first slave robot (robot C) as a handling robot and the master robot (robot A), but also transformation matrix $T_{CB}$ between a second slave robot (robot B) and the first slave robot (robot C). Batch processing is performed on the operation programs that include the target angle of each axis of manipulators 10A, 10B, and 10C of three robots A through C, respectively. Thus, three robots A through C can be synchronized smoothly and perform a cooperative operation with high precision.

Figure 8:
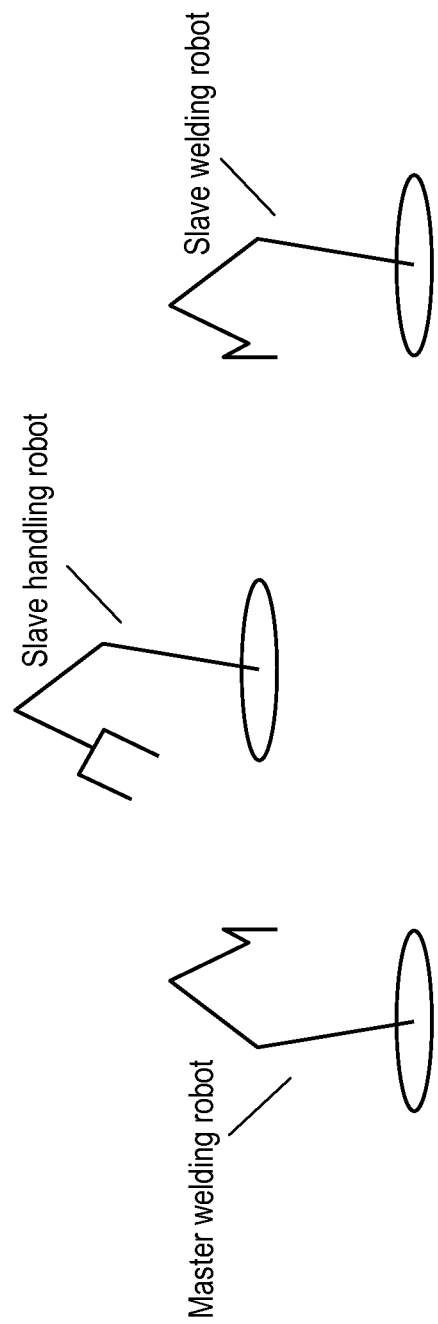
FIG. 8 is a diagram for explaining a system configuration in accordance with the first exemplary embodiment.
Figure 9:
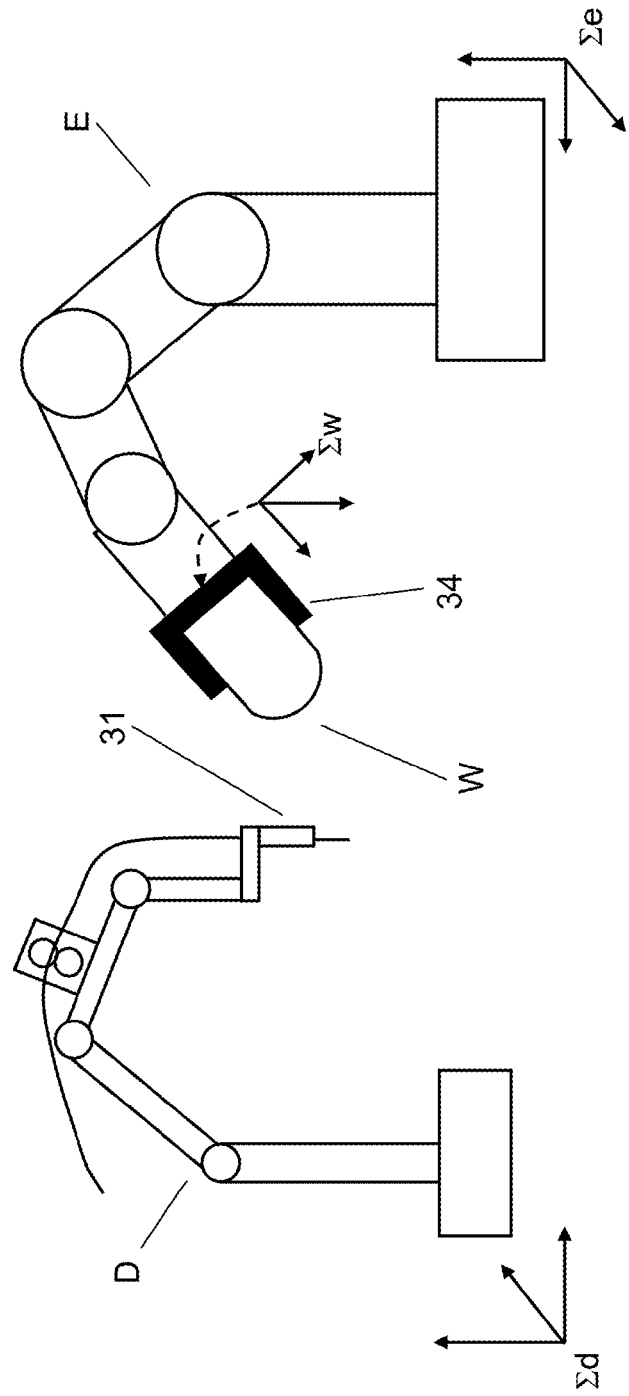
FIG. 9 is a diagram showing a conventional robot system.

Now, a description is provided for the advantage of storing the transformation matrix between the slave robots in the master robot, with reference to FIG. 8. FIG. 8 shows a robot system in which a handling robot holds a work piece and two working robots perform welding operation toward the handling robot on both sides. In order for one master robot to generate transformation matrices with respect to two slave robots in this robot system, the one master robot needs to perform the above TCP matching with each of the two slave robots. However, in the configuration of the robot system where robots A and B are distant from each other, the TCP matching of a welding robot as a master robot with a welding robot as a slave robot cannot be performed in some cases. The handling robot as a slave robot is disposed in the position where the TCP matching can be performed with both of a welding robot as a master robot and a welding robot as a slave robot.

In this case, it is possible to set the handling robot to a master robot and to generate transformation matrices with respect to two welding robots. However, preferably, the master robot is set to a robot most frequently used by the operator. Further, in a welding robot for performing specific operation, operating conditions, for example, are frequently changed. Thus, it is preferable that the master robot is a welding robot.

Even in the robot system where robots are disposed as shown in FIG. 8, the control method of this exemplary embodiment allows the master robot to store the transformation matrix generated by the TCP matching between the slave robots. Thus, the robot that cannot perform the TCP matching directly with a slave robot can operate as a master robot in cooperation with the slave robot.

As described above, this exemplary embodiment allows cooperative operation with a higher degree of freedom and construction of a robot system including three or more robots.

The above description has shown an example where two welding robots and one handling robot perform a cooperative operation. However, the number of welding robots may be three or greater. In that case, similarly to this exemplary embodiment, generating the transformation matrix between slave robots a plurality of times can achieve the cooperative operation.

In the example shown in this exemplary embodiment, each robot simply makes liner movement from the current position vector to the target position vector in work coordinate system $\Sigma w$. However, the locus from the current position vector toward the target position vector may be any shape, such as a circular arc shape.

In this exemplary embodiment, the example of welding operation is shown as a specific operation. However, the present disclosure can be used for operations other than welding, such as painting and transportation.

INDUSTRIAL APPLICABILITY

The present disclosure allows three or more robots to perform a cooperative operation with a high degree of freedom. For instance, the present disclosure is industrially useful as a robot system in which a plurality of welding robots performs cooperative welding operation on a work piece held by one handling robot, and a method for controlling the robot system.

REFERENCE MARKS IN THE DRAWINGS

A, B, C, D, E Robot
10A, 10B, 10C Manipulator
11A, 11B Welding torch
12A, 12B Welding wire feeder
13A, 13B Welding wire
14A, 14B Welding machine
15C, 34 Handling device
16A, 16B, 16C Controller
17AB, 17AC Optical fiber cable
18A, 18B, 18C Teaching pendant
20A, 20B, 20C Arithmetic part
21A Teaching data storage
22A, 22B, 22C Manipulator controller
23A, 23B Welding condition command part
24A, 24B, 24C Communication part
25AB, 25AC Slave robot communication part
25BA, 25CA Master robot communication part
26C Handling command part
26AC, 26BC Calibration point storage
27AC, 27BC Transformation matrix storage
Sna, Snb, Snc Current position vector
Swna, Swnb Transformed current position vector
Sra, Srb, Src Target position vector
Swra, Swrb Transformed target position vector
Swaj, Swbj Transformed locus target position vector
Saj, Sbj, Scj Locus target position vector

The invention claimed is:

1. A robot system control method comprising:
a first step in which the master robot (i) generates a first transformation matrix that represents a positional relation between a master robot and a first slave robot and (ii) stores the first transformation matrix in the master robot;
a second step in which the master robot (i) generates a second transformation matrix that represents a positional relation between the first slave robot and a second slave robot and (ii) stores the second transformation matrix in the master robot;
a third step in which the master robot instructs the first slave robot to operate based on a first command obtained using the first transformation matrix;
a fourth step in which the master robot instructs the second slave robot to operate based on a second command obtained using the first transformation matrix and the second transformation matrix; and
a fifth step in which(i) the first slave robot performs a cooperative operation with the master robot based on the first command and (ii) the second slave robot performs a cooperative operation with the master robot based on the second command,
wherein the master robot is distant from the second slave robot such that a tool center point of the master robot cannot be matched with a tool center point of the second slave robot.

2. The robot system control method of claim 1, wherein, in the first step, the first transformation matrix is generated by matching the tool center point of the master robot with a tool center point of the first slave robot at three different positions.

3. The robot system control method of claim 2, wherein, in the fifth step, the master robot, the first slave robot, and the second slave robot operate such that interpolation control that allows each of the robots to follow a locus is repeated.

4. The robot system control method of claim 3, wherein the master robot and the second slave robot perform welding operation and the first slave robot holds a work piece.

5. The robot system control method of claim 2, wherein the master robot and the second slave robot perform welding operation and the first slave robot holds a work piece.

6. The robot system control method of claim 1, wherein, in the second step, the second transformation matrix is generated by matching a tool center point of the first slave robot with the tool center point of the second slave robot at three different positions.

7. The robot system control method of claim 6, wherein, in the fifth step, the master robot, the first slave robot, and the second slave robot operate such that interpolation control that allows each of the robots to follow a locus is repeated.

8. The robot system control method of claim 7, wherein the master robot and the second slave robot perform welding operation and the first slave robot holds a work piece.

9. The robot system control method of claim 6, wherein the master robot and the second slave robot perform welding operation and the first slave robot holds a work piece.

10. The robot system control method of claim 1, wherein, in the fifth step, the master robot, the first slave robot, and the second slave robot operate such that interpolation control that allows each of the robots to follow a locus is repeated.

11. The robot system control method of claim 10, wherein the master robot and the second slave robot perform welding operation and the first slave robot holds a work piece.

12. The robot system control method of claim 1, wherein the master robot and the second slave robot perform welding operation and the first slave robot holds a work piece.

13. A robot system comprising:
   a master robot including a first storage, a second storage, and an arithmetic part;
   a first slave robot connected to the master robot; and
   a second slave robot connected to the master robot;
   wherein the arithmetic part generates a first transformation matrix that represents a positional relation between the master robot and the first slave robot, and the first storage stores the first transformation matrix,
   wherein the arithmetic part generates a second transformation matrix that represents a positional relation between the first slave robot and the second slave robot, and the second storage stores the second transformation matrix,
   wherein the arithmetic part obtains a first command using the first transformation matrix, and the arithmetic part instructs the first slave robot to operate based on the first command,
   wherein the arithmetic part obtains a second command using the first transformation matrix and the second transformation matrix, and the arithmetic part instructs the second slave robot to operate based on the second command,
   wherein the first slave robot performs a cooperative operation with the master robot based on the first command, and the second slave robot performs a cooperative operation with the master robot based on the second command, and
   wherein the master robot is distant from the second slave robot such that a tool center point of the master robot cannot be matched with a tool center point of the second slave robot.

* * * * *